United States Patent [19]

Tunks

[11] Patent Number: 4,616,792
[45] Date of Patent: * Oct. 14, 1986

[54] CRANK AND BRAKING MECHANISM FOR FISHING REELS

[76] Inventor: M. Larry Tunks, 16042 Mariner Dr., Huntington Bch., Calif. 92649

[ * ] Notice: The portion of the term of this patent subsequent to Jul. 2, 2002 has been disclaimed.

[21] Appl. No.: 744,334

[22] Filed: Jun. 13, 1985

Related U.S. Application Data

[63] Continuation-in-part of Ser. No. 550,757, Nov. 10, 1983, Pat. No. 4,526,331.

[51] Int. Cl.⁴ .................... A01K 89/00; A01K 89/02
[52] U.S. Cl. ................................ 242/218; 242/84.1 J
[58] Field of Search .................. 242/84.1 J, 84.5 R, 242/84.51 R, 211, 212, 213, 214, 216, 217, 218, 219, 220, 221; 74/68, 545

[56] References Cited

U.S. PATENT DOCUMENTS

| | | |
|---|---|---|
| Re. 24,153 | 5/1956 | Lockwood .............................. 74/750 |
| 1,495,676 | 5/1924 | Coxe . |
| 2,076,097 | 4/1937 | Schafer . |
| 2,209,598 | 7/1940 | Coxe . |
| 2,269,808 | 1/1942 | Cabassa . |
| 2,648,506 | 8/1953 | Kirby .................................. 242/218 |
| 2,836,995 | 6/1958 | Heddy ................................... 74/812 |
| 2,896,874 | 7/1959 | Nurmse . |
| 2,925,964 | 2/1960 | Holahan .............................. 242/218 |
| 2,977,065 | 3/1961 | Holahan, Jr. . |
| 3,025,020 | 3/1962 | Sarah .................................. 242/218 |
| 3,239,162 | 3/1966 | Henze . |
| 3,326,492 | 6/1967 | Murvall . |
| 3,375,993 | 4/1968 | Hayes .............................. 242/84.1 J |
| 3,572,608 | 3/1971 | Schultz ............................... 242/218 |
| 3,990,323 | 11/1976 | Kamikawa ........................... 74/546 |

Primary Examiner—Billy S. Taylor
Attorney, Agent, or Firm—Sheldon & Mak

[57] ABSTRACT

A braking mechanism for retrofitting onto a fishing reel allows the drag on the fishing line to be preset. The mechanism includes a braking wheel, a crank, and a stop. The stop is adjustably mounted on the crank. The fisherman moves the stop to a desired position to control the amount the braking wheel can be turned.

16 Claims, 6 Drawing Figures

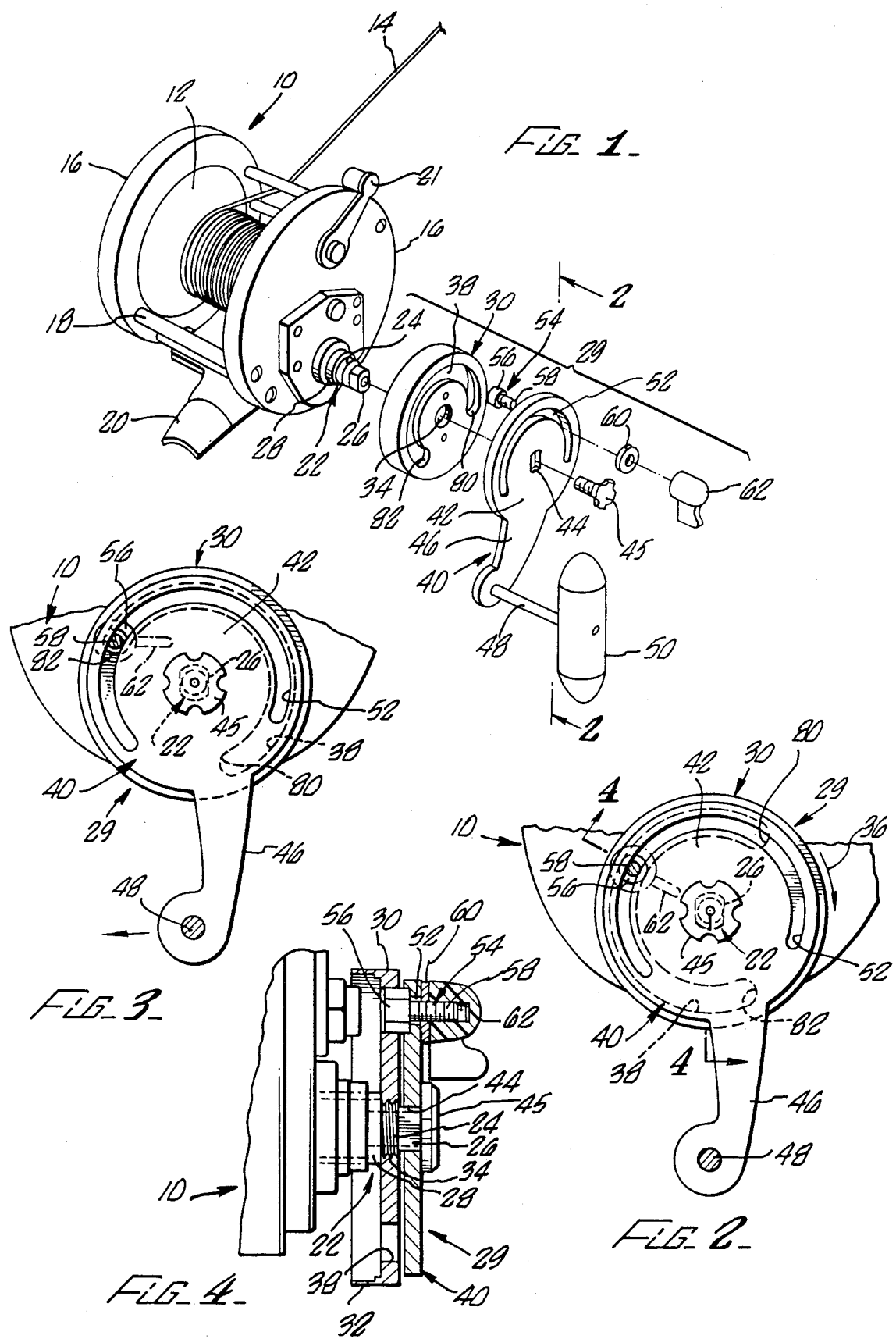

CRANK AND BRAKING MECHANISM FOR FISHING REELS

CROSS-REFERENCES

This application is a continuation-in-part of U.S. patent application Ser. No. 550,757 filed Nov. 10, 1983, now U.S. Pat. No. 4,526,331, which is incorporated herein by this reference.

BACKGROUND

The present invention relates to fishing reels, and in particular a combined crank and braking mechanism for fishing reels.

Fishing reels are conventionally provided with a braking mechanism for controlling the amount of drag on the fishing line being reeled out by a hooked fish. The greater the amount of drag, the harder it is for the fish to pull on the line and the faster the fish becomes tired. By properly controlling the amount of drag, the fish becomes sufficiently tired to be reeled in before all the fishing line is reeled out. However, if too much drag is placed on the reel, the line can brake.

A variety of fishing reel drives and braking mechanisms are shown. Attentio,n is directed to U.S. Pat. Nos. 2,073097; 2,836,995; 3,326,492; 3,375,993; 3,990,323; and Re. 24,153. A conventional braking mechanism includes a manual control member referred to in the trade as a star wheel as described in U.S. Pat. No. 2,076,097. The star wheel is threaded onto the shaft used for reeling in the fishing line. The axial position of the star wheel on the shaft controls the amount of drag.

A problem that occurs even with experienced fishermen is that the amount of drag placed on the reel is made too large or too small. This is a common problem because the fishermen becomes excited when a fish is first hooked. If the amount of drag is too large, the line can break. If the amount of drag is too small, the line can run out before the fish can be reeled in.

With expensive fishing reels, costing hundreds of dollars, a pre-set drag control mechanism can be provided to avoid this problem. However, no such mechanism is available for the less expensive reels. Thus, while the rich fisherman catches his fish, the average fisherman is left with an empty line, if any line at all.

SUMMARY

The present invention is directed to a solution to this problem. The present invention provides a crank and braking mechanism that can be retrofitted to existing inexpensive reels to provide a pre-set braking mechanism so that once a fish is hooked, the amount of drag on the reel is predetermined.

The braking mechanism can be retrofitted onto existing fishing reels. Such reels comprise a spool, a brake for controlling the amount of drag on fishing line being reeled out from the spool, and a shaft for driving the spool, the shaft being provided with a threaded end portion extending axially outwardly of the spool. The braking mechanism comprises a disc-shaped braking wheel for threading onto the end portion of the shaft to rotate therewith. The braking wheel replaces the conventional star wheel, and as with the conventional star wheel, the amount the braking wheel is threaded onto the shaft controls the amount of drag. The braking wheel has a slot extending circumferentially around part of its periphery.

The mechanism also includes a crank mountable on the end portion of the shaft beyond the braking wheel. This crank replaces the crank conventionally provided with a fishing reel. The crank includes a stop extending into the slot of the braking wheel for limiting the amount the braking wheel can be threaded onto the shaft. Means are provided for adjustably mounting the stop on the crank and for fixing the position of the stop on the crank so that the amount the braking wheel can be threaded onto the shaft can be predetermined for predetermining the drag on the fishing reel.

Alternatively, the slot can be replaced by a circumferential depression or a circumferential raised portion on the braking wheel.

Thus, merely by replacing the star mechanism and the crank of a fishing reel with the braking mechanism of the present invention, a fishing reel can be converted into one that provides a pre-set braking load.

DRAWINGS

These and other features, aspects, and advantages of the present invention will become better understood with reference to the following description, appended claims, and accompanying drawings where:

FIG. 1 is an exploded perspective view of a fishing reel embodying features of the present invention with the braking wheel having a slot therein;

FIG. 2 is a side elevation of a portion of the braking mechanism of FIG. 1 taken along line 2—2 in FIG. 1;

FIG. 3 is a view similar to that of FIG. 2 with the braking wheel of the reel of FIG. 1 rotated to its preset position;

FIG. 4 is a sectional view of the braking mechanism of the reel of FIG. 2 taken along line 4—4 of FIG. 2.

DESCRIPTION

Figure 5:
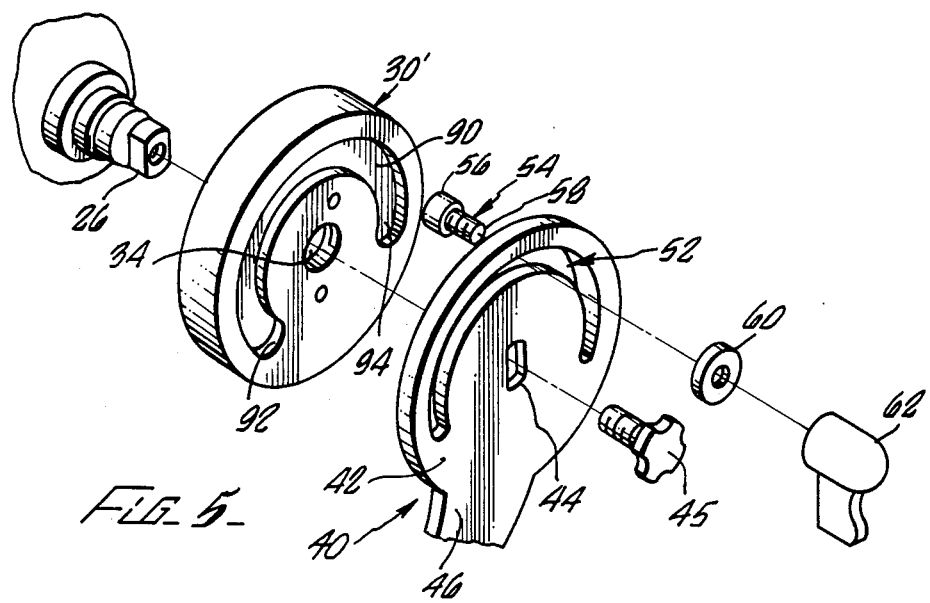
FIG. 5 is an exploded view of a portion of another version of a braking mechanism according to the present invention, with the braking wheel having a depression therein.
Figure 6:
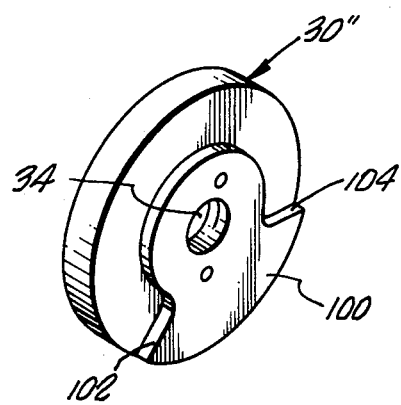
FIG. 6 is a perspective view of a braking wheel which can be used with the braking mechanism of the present invention, the braking wheel having a raised portion therein.

With reference to the figures, there is shown a conventional reel 10 without its conventional star wheel and crank. Reel 10 shown in the figures is based upon a Penn reel 3/0H Special Senator Model 112H available from Penn Fishing Tackle Manufacturing Company of Philadelphia, Pa.

The reel 10 includes a rotatable spool 12 upon which a fishing line 14 is wound and unwound. The spool is journalled between two end plates 16 which are secured in their relative positions by means of spacing bars or pillars 18 therebetween. A mounting bracket 20 is used to releasably secure the reel to a rod (not shown). The reel 10 includes a clutch mechanism with a clutch arm 21 mounted on one of the end plates 16.

The reel 10 includes a drive shaft 22 having an end portion 24 which is externally threaded, the tip 26 of the end portion 24 being oblong in shape and having an internally threaded bore.

A sleeve 28 is slideably mounted on the outside of the drive shaft 22 and engages a conventional brake (not shown) of the reel 10. The more the sleeve 28 is forced inwardly, the more drag exerted by the brake when unwinding the fishing line 14.

The reel 10 is provided with a brake and crank mechanism 29 according to the present invention. This mechanism 29 includes a disc-shaped braking wheel 30 having a peripheral flange 32. The braking wheel 30 has a threaded hole 34 through its center by which it is threaded onto the end portion 24 of the shaft 22. The more the braking wheel is threaded in a clockwise direction as shown by arrow 36 in FIG. 2, the more the sleeve 28 causes an increase in drag on unwinding the fishing line 14. The braking wheel 30 has a slot 38 extending circumferentially around the peripheral portion of its face. The slot has a first end 80 and a second end 82. The slot extends for about 220 degrees.

A crank 40 is provided for cranking the shaft 22. The crank includes a disc-shaped section 42 having an oblong hole 44 through its center for mounting on the oblong tip 26 of the drive shaft 22. A nut 45 holds the crank 40 on the shaft, the nut 45 being threaded into the internal threads of the tip 26.

The crank 40 includes a lever arm 46 extending radially from the central disc-shape portion 42. A shank 48 is rotatably mounted at the end of the lever arm 46. The shank has a hand knob 50 by which the crank is turned for cranking the drive shaft 22.

The crank 40 has in the disc-shape portion 42 a circumferential slot 52 generally the same as the brake slot 38 and generally in register therewith. Like the brake slot 38, the crank slot 52 is greater than 180 degrees in extent, about 220 degrees in extent, so that there is always some overlap between the crank slot 52 and the brake slot 38.

A stop mechanism is adjustably mounted on the crank 40 for limiting the amount the braking wheel 30 can be rotated on the shaft 22. This stop mechanism comprises a nut 54 having a head 56 and a threaded stem 58. The braking slot 38 has a width greater than the width of the crank slot 52. The head 56 of the nut 54 is sufficiently small to fit into the brake slot 38 but too large to fit into the crank slot 52. The stem 58 extends through the crank slot 52, has a washer 60 mounted thereon, and is held in place by a finger nut 62.

In use of the braking mechanism 29, the braking wheel 30 is backed off to provide little, if any, drag on the fishing line 14 while trolling for fish. The nut 54 is held in a fixed position on the crank with the finger nut 62, the position being determined by the amount of drag desired on line 14 when a fish is hooked. The location of the brake wheel 30 relative to the stop nut 54 is shown in FIG. 2 in this mode. Both the brake wheel 30 and the crank 40 rotate together on the shaft 22 as the shaft is driven by the crank 40. The stop mechanism is shown between the ends 80 and 82 of the brake slot 38 in FIG. 2. If desired, the brake wheel can be rotated so that the first end 80 of the brake slot is against the stop mechanism head 56.

Once a fish is hooked, the brake wheel 30 is rotated clockwise until the second end 82 of the brake slot abuts against the head 56 of the stop nut 54 as shown in FIG. 3, thereby providing a predetermined amount of drag on the fishing line.

Thus, the present invention provides a mechanism for predetermining the drag on a fishing line for when a fish is caught. The fisherman, in the excitement of hooking a fish, need not worry about putting too much drag or not enough drag on the line. The drag can be set for any poundage at the discretion of the fisherman. This invention allows the fisherman to preset the drag at his discretion dependent upon such factors as boat speed, size of line, type of equipment, skill of the fisherman, species and weight of fish expected to be hooked, and sea conditions.

Alternatively, as shown in FIG. 5, a braking wheel 30' has a depression 90 (rather than a slot) extending circumferentially around the peripheral portion of its surface facing away from the spool 12. The depression has a first end 92 and a second end 94. The depression extends for more than 180 degrees, preferably about 220 degrees. The brake wheel depression 90 has a width greater than the width of the crank slot 52. The depression 90 and the crank slot 52 are in register. The head 56 of the stop mechanism is sufficiently small to fit into the depression 90 but too large to fit into the crank slot 52. The head 56 of the stop mechanism fits inside the depression 90 between its ends 92 and 94.

In another alternative version, a braking wheel 30'' has a raised portion 100 extending circumferentially around the peripheral portion of the wheel's surface facing away from spool 12. The raised portion has a first end 102 and a second end 104. The raised portion extends less than 180°, preferably about 140 degrees. The raised portion 100 and the crank slot 52 are in register. The head 56 of the stop mechanism can be stopped by either of the ends 102 and 104 of the raised portion 100.

Although the present invention has been described in considerably detail with reference to certain versions thereof, other versions are possible. Therefore, the spirit and scope of the appended claims should not necessarily be limited to the description of the preferred versions contained herein.

What is claimed is:
1. A fishing reel comprising:
 (a) a spool for reeling in and reeling out fishing line;
 (b) a shaft for driving the spool and provided with a threaded end portion extending axially outwardly of the spool;
 (c) a disc-shaped braking wheel threaded onto the end portion of the shaft and rotatable therewith, the braking wheel including an outer surface facing away from the spool, the amount the braking wheel is threaded onto the shaft controlling the amount of drag on the fishing line, the braking wheel having a raised portion extending circumferentially around part of the periphery of its outer surface;
 (d) a crank fixed to the end portion of the shaft beyond the braking wheel for rotating the shaft and the braking wheel;
 (e) a stop extending from the surface of the crank facing the braking wheel, for limiting the amount the braking wheel can be threaded onto the shaft;
 (f) means for adjustably mounting the stop on the crank comprising a circumferential slot extending through a disc-shaped portion of the crank, the crank slot being in register with at least a portion of the raised portion of the braking wheel, and wherein the stop is slideable in the crank disc slot; and
 (g) means for fixing the position of the stop on the crank so that the amount the braking wheel can be threaded into the shaft can be predetermined for predetermining the drag on the fishing line.

2. The fishing reel of claim 1 in which the stop fixing means comprise:
 (a) a head on the stop, the head being too large to fit into the crank disc slot;
 (b) a threaded stem on the stop, the stem extending through the crank slot; and (c) fastening means threaded onto the stem outside of the crank for locking the stop in position.

3. The fishing reel of claim 1 in which the shaft is both internally and externally threaded, and wherein the braking wheel is provided with threads to be threaded onto the outside threads of the shaft, and wherein the crank fits over the outside of the shaft and is provided with a fastener that is threaded into the inside threads of the shaft.

4. The fishing reel of claim 1 in which the raised portion on the braking wheel extends less than 180 degrees, and the crank slot extends more than 180 degrees.

5. A braking mechanism for retrofitting a fishing reel, the fishing reel comprising a spool, a brake for controlling the amount of drag on fishing line being unwound from the spool, and a shaft for driving the spool and provided with a threaded end portion extending axially outwardly of the spool, the braking mechanism comprising:
  (a) a disc-shaped braking wheel for threading onto the end portion of the shaft to rotate therewith, the braking wheel including an outer surface facing away from the spool, the amount the braking wheel is threaded onto the shaft controlling the amount of drag, the braking wheel having a raised portion extending circumferentially around part of the periphery of its outer surface;
  (b) a crank mountable on the end portion of the shaft beyond the braking wheel for rotating the shaft and the braking wheel;
  (c) a stop extending from the surface of the crank facing the braking wheel, for limiting the amount the braking wheel can be threaded onto the shaft;
  (d) means for adjustably mounting the stop on the crank comprising a circumferential slot extending through a disc-shaped portion of the crank, the crank slot being in register with at least a portion of the raised portion of the braking wheel, and wherein the stop is slideable in the crank disc slot.

6. The braking mechanism of claim 5 in which the fixing means comprise:
  (a) a head on the stop, the head sized too large to fit into the crank disc slot;
  (b) a threaded stem on the stop, the stem extending through the crank disc slot; and
  (c) fastening means threaded onto the stem outside of the crank for locking the stop in position.

7. The braking mechanism of claim 5 in which the raised portion extends less than 180 degrees and the crank slot extends more than 180 degrees.

8. A fishing reel comprising:
  (a) a spool for reeling in and reeling out fishing line;
  (b) a shaft for driving the spool and provided with a threaded end portion extending axially outwardly of the spool;
  (c) a disc-shaped braking wheel threaded onto the end portion of the shaft and rotatable therewith, the amount the braking wheel is threaded onto the shaft controlling the amount of drag on the fishing line, the braking wheel having a depression extending circumferentially around part of the wheel's periphery on the wheel surface facing away from the spool;
  (d) a crank fixed to the end portion of the shaft beyond the braking wheel for rotating the shaft and the braking wheel;
  (e) a stop extending into the depression on the braking wheel for limiting the amount the braking wheel can be threaded onto the shaft;
  (f) means for adjustably mounting the stop on the crank comprising a circumferential slot extending through a disc-shaped portion of the crank, the crank slot being in register with at least a portion of the depression on the braking wheel, and wherein the stop is slideable in the crank disc slot; and
  (g) means for fixing the position of the stop on the crank so that the amount the braking wheel can be threaded into the shaft can be predetermined for predetermining the drag on the fishing line.

9. The fishing reel of claim 8 in which the width of the crank slot is smaller than the width of the braking wheel depression.

10. The fishing reel of claim 8 in which the fixing means comprise:
  (a) a head on the stop, the head sized to fit into the braking wheel depression but too large to fit into the crank disk slot;
  (b) a threaded stem on the stop, the stem extending through the crank slot; and
  (c) fastening means threaded onto the stem outside of the crank for locking the stop in position.

11. The fishing reel of claim 8 in which the shaft is both internally and externally threaded, and wherein the braking wheel is provided with threads to be threaded onto the outside threads of the shaft, and wherein the crank fits over the outside of the shaft and is provided with a fastener that is threaded into the inside threads of the shaft.

12. The fishing reel of claim 8 in which the depression on the braking wheel and the crank slot both extend more than 180 degrees.

13. A braking mechanism for retrofitting a fishing reel, the fishing reel comprising a spool, a brake for controlling the amount of drag on the fishing line being unwound from the spool, and a shaft for driving the spool and provided with a threaded end portion extending axially outwardly of the spool, the braking mechanism comprising:
  (a) a braking wheel for threading onto the end portion of the shaft to rotate therewith, the amount the braking wheel is threaded onto the shaft controlling the amount of drag, the braking wheel having a depression extending circumferentially around part of the wheel's periphery on the wheel surface facing away from the spool;
  (b) a crank mountable on the end portion of the shaft beyond the braking wheel for rotating the shaft and the braking wheel;
  (c) a stop extending into the depression on the braking wheel for limiting the amount the braking wheel can be threaded onto the shaft;
  (d) means for adjustably mounting the stop on the crank comprising a circumferential slot extending through a disc-shaped portion of the crank, the crank slot being in register with at least a portion of the depression on the braking wheel, and wherein the stop is slideable in the crank disc slot.

14. The braking mechanism of claim 13 in which the width of the crank disc slot is smaller than the width of the braking wheel depression.

15. The braking mechanism of claim 13 in which the fixing means comprise:

(a) a head on the stop, the head sized to fit into the brake wheel depression but too large to fit into the crank disk slot;
(b) a threaded stem on the stop, the stem extending through the crank slot; and
(c) fastening means threaded onto the stem outside of the crank for locking the stop in position.

16. The braking mechanism of claim 13 in which both the braking wheel depression and the crank slot extend more than 180 degrees.

* * * * *